United States Patent
Bradley et al.

(10) Patent No.: US 9,779,487 B2
(45) Date of Patent: Oct. 3, 2017

(54) METHODS AND SYSTEMS OF LOCAL SIGNAL EQUALIZATION

(71) Applicant: Disney Enterprises, Inc., Burbank, CA (US)

(72) Inventors: Derek Bradley, Zurich (CH); Thabo Beeler, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 66 days.

(21) Appl. No.: 14/278,371

(22) Filed: May 15, 2014

(65) Prior Publication Data
US 2015/0104111 A1 Apr. 16, 2015

Related U.S. Application Data

(60) Provisional application No. 61/889,991, filed on Oct. 11, 2013.

(51) Int. Cl.
    *G06T 5/00* (2006.01)
    *G06T 5/10* (2006.01)
    *G06T 7/32* (2017.01)

(52) U.S. Cl.
    CPC .......... *G06T 5/003* (2013.01); *G06T 5/10* (2013.01); *G06T 7/32* (2017.01); *G06T 2207/20016* (2013.01); *G06T 2207/20021* (2013.01)

(58) Field of Classification Search
    None
    See application file for complete search history.

(56) References Cited

U.S. PATENT DOCUMENTS

| 7,596,284 B2* | 9/2009 | Samadani | G06T 3/4023 345/698 |
| 8,406,507 B2* | 3/2013 | Ruzon | G06K 9/4609 382/154 |
| 2011/0085728 A1* | 4/2011 | Gao | G06K 9/4671 382/165 |
| 2012/0045095 A1* | 2/2012 | Tate | G06T 5/003 382/103 |

(Continued)

FOREIGN PATENT DOCUMENTS

| CN | 101551902 B * | 7/2011 |
| KR | 2007-0010352 A * | 1/2007 |

OTHER PUBLICATIONS

S. Baker, D. Scharstein, J.P. Lewis, S. Roth, M. J. Black, and R. Szeliski, A Database and Evaluation Methodology for Optical Flow, IJCV, 2011, 92, pp. 1-31.

(Continued)

*Primary Examiner* — Sumati Lefkowitz
*Assistant Examiner* — Jiangeng Sun
(74) *Attorney, Agent, or Firm* — Sheppard, Mullin, Richter & Hampton LLP

(57) ABSTRACT

Methods and systems of equalizing spatial frequency signals for images are provided. Images distorted through defocus, motion blur, under-sampling or other reasons may be equalized. Equalized spatial frequency signals may be used to determine correspondence matching between images. Image patches from two or more image signals may be identified and analyzed to determine image patches that contain similar representations of the real scene, with sufficient local details for accurately computing cross-correlation.

14 Claims, 9 Drawing Sheets

(56) References Cited

U.S. PATENT DOCUMENTS

| | | | | |
|---|---|---|---|---|
| 2014/0063275 A1* | 3/2014 | Krahenbuhl | ............ | G06T 7/0081 348/208.4 |
| 2014/0064554 A1* | 3/2014 | Coulter | ................ | G06K 9/3216 382/103 |
| 2014/0307978 A1* | 10/2014 | Balestrieri | ................ | G06T 3/00 382/263 |

OTHER PUBLICATIONS

T. Beeler, B. Bickel, P. Beardsley, B. Sumner, and M. Gross, High-Quality Single-Shot Capture of Facial Geometry, ACM Trans. Graphics (Proc. SIGGRAPH), 2010.

D. Bradley, T. Boubekeur, and W. Heidrich, Accurate Multi-View Reconstruction Using Robust Binocular Stereo and Surface Meshing, CVPR, 2008

P. Brigger, F. Muller, K. Illgner, and M. Unser, Centered Pyramids, IEEE Trans. Image Proc., 8(9), 1999.

B. Cyganek, Adaptive Window Growing Technique for Efficient Image Matching, LNCS, 3522:308-315, 2005.

J. Ens and P. Lawrence, An Investigation of Methods for Determining Depth from Focus. IEEE Trans. PAMI, 15:97-108, 1993.

Y. Furukawa and J. Ponce, Accurate, Dense, and Robust Multiview Stereopsis, IEEE Trans, PAMI, 32(8): 1362-1376, 2010.

M. Goesele, N. Snavely, B. Curless, H. Hoppe, and S. Seitz, Multi-View Stereo for Community Photo Collections, ICCV, 2007.

M. Habbecke and L. Kobbelt, A Surface-Growing Approach to Multi-View Stereo Reconstruction, CVPR, 2007.

X. Hu and P. Mordohai, A Quantitative Evaluation of Confidence Measures for Stereo Vision, IEEE Trans, PAMI, 34 (11), 2012.

W. Jakob, Mitsuba Renderer, 2012, www.mitsuba-renderer.org.

H. Jin and P. Favaro, A Variational Approach to Shape from Defocus, ECCV, 2002.

T. Kanade and M. Okutomi, A Stereo Matching Algorithm with an Adaptive Window: Theory and Experiment, IEEE Trans. PAMI, 13(9), 1994.

R. Klowsky, A. Kuijper, and M. Goesele, Modulation Transfer Function of Patch-Based Stereo Systems, CVPR, 2012.

R. Klowsky A. Kuijper, and M. Goesele, Weighted Patch-Based Reconstruction: Linking (multi-view) Stereo to Scale Space, LNCS, 7893, 2013.

H. S. Koo and C.S. Jeong, An Area-based Stereo Matching Using Adaptive Search Range and Window Size, LNCS 2074:44-53, 2001.

S. Li, J.T. Kwok, and Y. Wang, Combination of Images with Diverse Focuses Using the Spatial Frequency, Information Fusion 2(3):169-176, 2001.

C. Menard and W. Kropatsch, Adaptive Stereo Matching in Correlation Scale-Space, LNCS, 1310:677-684, 1997.

A. S. Ogale and Y. Aloimonos, Shape and the Stereo Correspondence Problem. IJCV, 65(3):147-162, 2005.

D. Scharstein and R. Szeliski, A Taxonomy and Evaluation of Dense Two-Frame Stereo Correspondence Algorithms, IJCV, 47(1/2/3), 7-42, 2002.

S. M. Seitz, B. Curless, J. Diebel, D. Scharstein, and R. Szeliski, A Comparison and Evaluation of Multi-View Stereo Reconstruction Algorithms, CVPR, 2006.

M. Subbarao and G. Surya, Depth from Defocus: A Spatial Domain Approach, IJCV, 13(3)271-294, 1994.

S. Yoon, D. Min, and K. Sohn, Fast Dense Stereo Matching Using Adaptive Window in Hierarchical Framework, LNCS 4292, pp. 316-325, 2006.

\* cited by examiner

METHODS AND SYSTEMS OF LOCAL SIGNAL EQUALIZATION

CROSS-REFERENCE TO RELATED APPLICATIONS

This application claims the benefit of U.S. Provisional Application No. 61/889,991, filed on Oct. 11, 2013 and which is hereby incorporated herein by reference in its entirety.

TECHNICAL FIELD

The present disclosure relates generally to computer vision, and more particularly to equalizing local image signals from multiple images.

BACKGROUND

Computer vision is the enterprise of automating and integrating a wide range of processes and representations for vision perception. Images are acquired, processed, analyzed, and understood. In general, high-dimensional data from the real world is used to produce numerical or symbolic information, e.g., in the form of decisions. Computer vision is concerned with the theory behind artificial systems that extract information from images. The image data can take many forms, such as video sequences, views from multiple cameras, or multi-dimensional data from a medical scanner. Computer vision encompasses many domains including scene reconstruction, event detection, video tracking, object recognition, learning, indexing, motion estimation, and image restoration.

SUMMARY OF EMBODIMENTS

Various embodiments equalize spatial frequency signals for images. Images distorted through defocus, motion blur, under-sampling or other reasons may be equalized. Equalized spatial frequency signals may be used to determine correspondence matching between images. Image patches from two or more image signals may be identified and analyzed to determine image patches that contain similar representations of the real scene, with sufficient local details for accurately computing cross-correlation.

In various embodiments, local frequency maps are generated for image patches. Local frequency information at each pixel of an image patch may be determined and the highest spatial frequency of the image patch may be analyzed. A local frequency map may be generated by determining the highest frequency for every pixel of an image patch. Discrete Fourier Transform ("DFT") may be applied to an image frequency to measure image frequencies. Noise may be accounted for when determining the highest reliable frequency in the image patch. The highest reliable frequency for each image patch may be determined by thresholding on the amplitude for each frequency.

In various embodiments, a scale-space representation may be determined for each image patch. The local signal at an image pixel may be altered by traversing the scale-space of the image patch. The scale-space representation may be a set of Gaussian pyramids. Each Gaussian pyramid of the set of Gaussian pyramids may be centered on a different pixel of the image patch. As such, a pixel of a lower level of a Gaussian pyramid is directly mapped to a unique pixel of a higher level of the Gaussian pyramid.

Methods described herein may also be implemented through a computer processor, for example, to be used in computer vision, or other computer-driven video processing techniques. An example would be to equalize frame-to-frame signals for optical flow estimation or video stabilization that have been degraded by time varying blur, such as motion blur or focus change. Another example is to equalize local signals for template matching or image registration. Furthermore, embodiments of the disclosure may be used as a pre-processing technique to modify input data such that the output can be used in combination with a wide variety of existing powerful correspondence techniques.

Other features and aspects of the disclosure will become apparent from the following detailed description, taken in conjunction with the accompanying drawings, which illustrate, by way of example, the features in accordance with embodiments of the disclosure. The summary is not intended to limit the scope of the disclosure, which is defined solely by the claims attached hereto.

BRIEF DESCRIPTION OF DRAWINGS

The present disclosure, in accordance with one or more various embodiments, is described in detail with reference to the following figures. The figures are provided for purposes of illustration only and merely depict typical or example embodiments of the disclosure.

The figures are not intended to be exhaustive or to limit the disclosure to the precise form disclosed. It should be understood that the disclosure can be practiced with modification and alteration, and that the disclosure can be limited only by the claims and the equivalents thereof.

DETAILED DESCRIPTION

Computing correspondences between images is a fundamental problem in computer vision. Correspondence matching is key to many applications including stereo and multi-view reconstruction, optical flow, template matching, image registration, and video stabilization.

Several metrics may be used to measure the similarity between image patches. One of the most common measures is normalized cross-correlation (NCC), which forms the basis for a wide range of matching algorithms. However, NCC assumes the input images contain the same signal content. In other words, NCC assumes that all images are true representations of the original scene signal or are equally distorted through defocus, motion blur, under-sampling, etc. In many practical situations, signal content of mixed-signals may be different. For example, different amounts of defocus blur may cause signal content to vary. In addition, signal degradation may vary spatially in most practical situations, which may cause mixed-signal variance for every pixel in an image. Accordingly, correspondence of mixed-signals needs to be determined.

Existing patch-based correlation measures also assume that frequency signals are consistent in images before matching. However, a mismatch of signals between images may occur. For example, cameras may have different focal points, which may result in signal mismatch. This issue may be avoided by collecting a large set of images and choosing the ones that have similar properties. Nevertheless, this approach is only viable for reconstructing well-known and well-photographed landmarks.

In correspondence matching, signal content is related to the matching window size. A matching window may be adapted to the image content using disparity uncertainty measures, edge information, entropy, object boundaries, correlation, intensity variation, or perspective distortion. However, the "mixed" signal problem remains unsolved. By using a modulation transfer function in frequency space that can be inverted, details may be restored as amplitude of high-frequency details is diminished in reconstructions. Gaussian weighting of stereo patch correspondences that links reconstruction to a scale-space representation of the underlying surface may be applied. Signals are nevertheless not equalized prior to performing descriptor matching or learning techniques.

Figure 1:
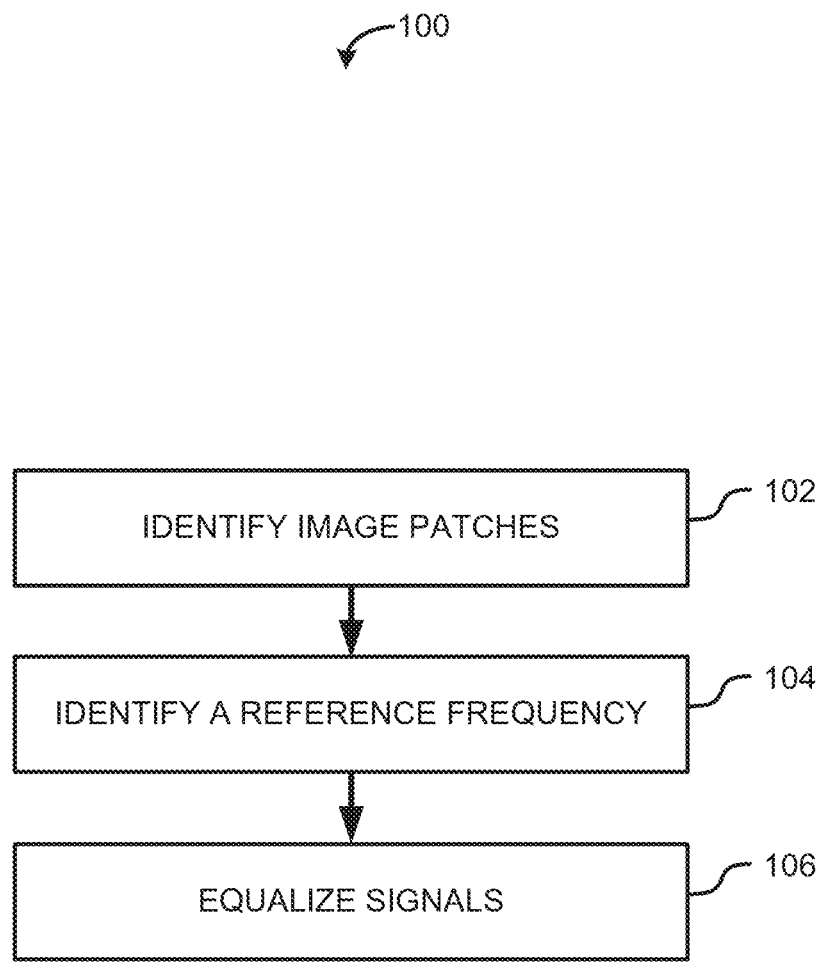
FIG. 1 is a flow diagram illustrating an example method of local signal equalization in accordance with an embodiment of the present application.

FIG. 1 is a flow diagram illustrating an example method of local signal equalization. Image signals may be equalized prior to determining correspondence matching between images. At step 102, image patches $\{p_1 \ldots p_i\}$ are identified from images $\{I_1 \ldots I_i\}$ for correspondence matching and spatial frequency signals are generated for each image patch. Image patches may be selected according to a user-defined correspondence matching window of size k centered around an image pixel. Image patches may be selected by sequencing through every pixel of an image. Some images may be based on the same scene but degraded. That is, their frequency contents may be compatible and optimally suited for matching with respect to a given matching function $\psi$. In the frequency domain, a degraded image signal G may be represented according to Equation (1):

$$G(\omega) = D(\omega)\hat{G}(\omega) + \mu(\omega), \qquad (1)$$

where $D(\omega)$ is the degradation function, $\hat{G}(\omega)$ is the non-degraded signal, and $\mu(\omega)$ is the noise model.

At step 104, a reference frequency $\tilde{\omega}$ is identified. Subsequently, at step 106, spatial frequency signals may be equalized. The spatial frequency signals correspond to image patches that are based on the same scene but may contain different spatial frequency signals of the same content. An equalized signal may be represented according to Equation (2):

$$\tilde{G}(\omega) = \Pi_{\tilde{\omega}} G\left(\omega \frac{\pi}{\tilde{\omega}}\right), \qquad (2)$$

where $\tilde{\omega}$ is the minimum of the highest frequencies for the image patches, which are determined based on a threshold $\alpha$.

Figure 2:
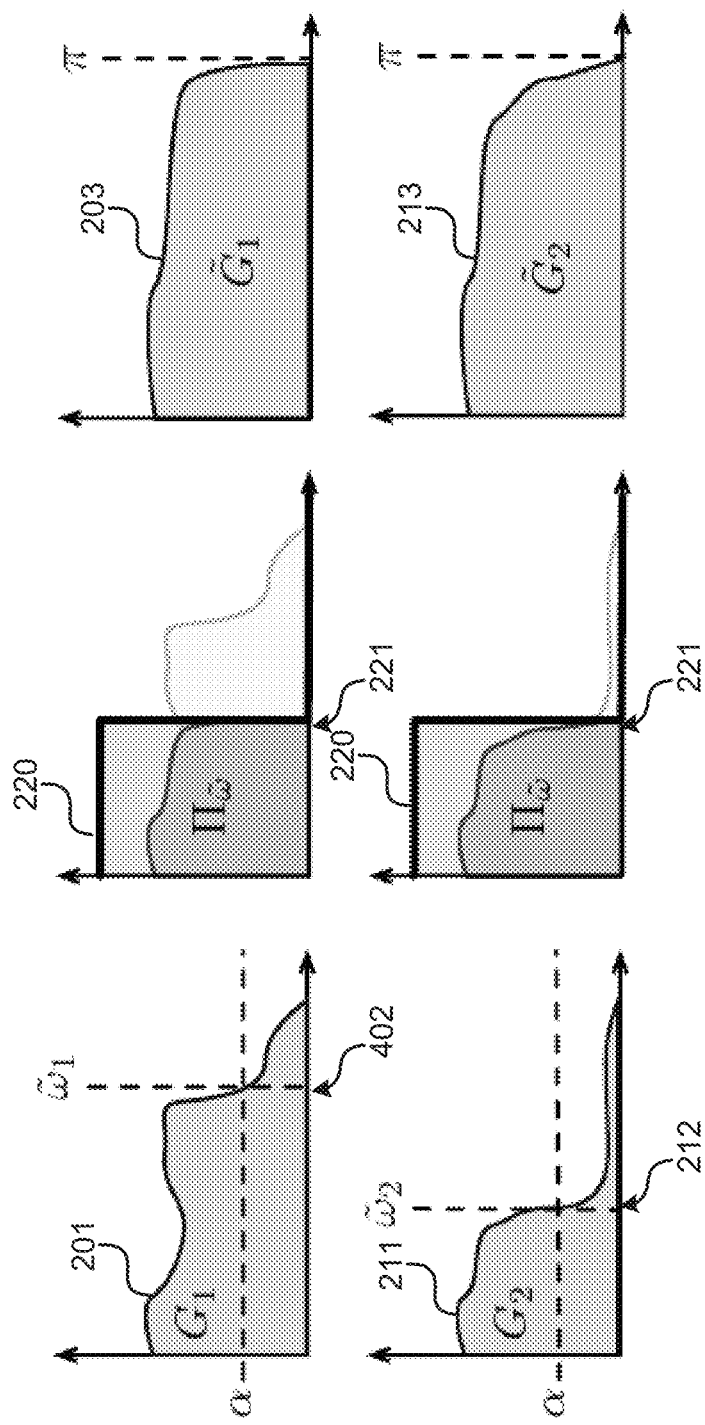
FIG. 2 illustrates a series of frequency plots illustrating inter-signal equalization of image signals in accordance with an embodiment of the present application.

FIG. 2 illustrates a series of frequency plots illustrating inter-signal equalization of two image signals G1($\omega$) 201 and G2($\omega$) 211. The signals G1($\omega$) and G2($\omega$) are degraded image signals. The highest frequencies for image signals may be determined. For example, the highest frequencies, $\tilde{\omega}_1$ 202 and $\tilde{\omega}_2$ 212, for the signals G1($\omega$) 201 and G2($\omega$) 211, respectively, may be found by plotting the signals on a frequency domain and applying a threshold $\alpha$. The lowest value among the highest frequencies for image signals may be determined and used as a cutoff frequency for a lowpass filter. For example, the lower of the two frequencies $\tilde{\omega}_1$ and $\tilde{\omega}_2$ may be used as a cutoff frequency $\tilde{\omega}$ 221 for a lowpass filter $\Pi_{\tilde{\omega}}$ 220.

Frequencies for each image signal may be scaled by $\pi/\tilde{\omega}$ to spread the frequencies over a domain. The scaled signals may be used to determine correspondence matching between images. The higher the spatial frequency $\omega$, the better the signal may be localized. Due to the discrete nature of an image, the shortest wavelength possible is $\lambda=2$ pixels and thus the highest frequency is $\omega_{max}=2\pi 1/\lambda=\pi$. For example, frequencies in signals G1($\omega$) 201 and G2($\omega$) 211 are scaled by $\pi/\tilde{\omega}$. The scaled signals 203 and 213 spread over the available domain and may be used to determine correspondence matching.

Figure 3:
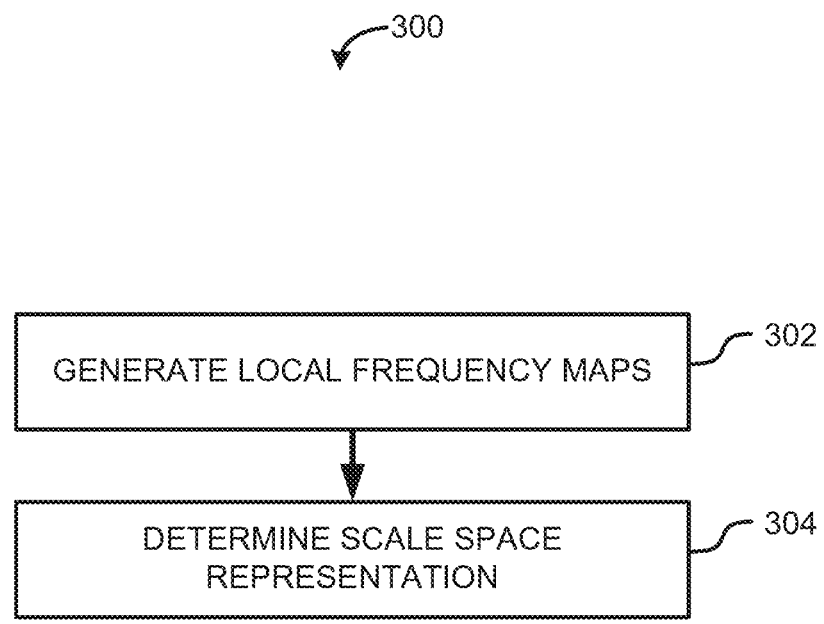
FIG. 3 is a flow diagram illustrating an example method of determining a reference frequency for equalizing image signals, such as step 104 illustrated in FIG. 1.

FIG. 3 is a flow diagram illustrating an example method of determining a reference frequency for equalizing image signals, such as the step 104 illustrated in FIG. 1. At step 302, a local frequency map is generated for each image patch. The local frequency map may be generated by determining the highest frequency $\tilde{\omega}^p$ for every pixel in the image patch. Image frequencies for each image patch $p_i$ may be measured by using Discrete Fourier Transform (DFT). Other frequency conversion techniques such as fast Fourier transformations (FFT) or discrete wavelet transformations (DWT) may be used. The highest spatial frequency for the image patch may be analyzed by determining local frequency information for each pixel of an image patch. The highest spatial frequency for each pixel in an image patch may be analyzed based on the local frequency for the image patch. Noise may be accounted for by thresholding the frequency amplitudes when determining the highest reliable frequency. For an image patch p, the discrete set of frequencies, $\Omega^p = \{\omega_i^p\}$, have corresponding amplitudes, $A^p = \{\alpha_i^p\}$. The highest frequency $\tilde{\omega}^p$ may be determined according to Equation (3):

$$\tilde{\omega}^p = \max_i(\Omega^p \mid \alpha_i^p > \alpha), \qquad (3)$$

where $\alpha$ characterizes the amplitude of the image noise in the frequency domain. In some embodiments, $\alpha$ may be selected based on the noise value. In some embodiments, $\alpha$ may be selected empirically.

Subsequently, at step 304, the scale space representation of the image patch is determined. The frequency may be scaled to a scaled frequency for which a spatial localization is the best. In one embodiment, frequency is scaled according to Equation (4), when a deviation from the minimum at t=0 by a spatial differential amounts in a maximal change of $\psi_{NCC}$:

$$\left\| \frac{d^2}{dt^2} \Psi_{NCC}[\sin_\omega, \sin_\omega](t) \right\| = \|-\omega^2 \cos(\omega t)\||_{t=0} = \omega^2, \quad (4)$$

where $\psi_{NCC}$ is the normalized cross correlation matching function (5):

$$\Psi_{NCC}[g, f](t) := \frac{\int_{-\infty}^{\infty} g(\tau) f(\tau + t) d\tau}{\sqrt{\int_{-\infty}^{\infty} g(\tau)^2 d\tau \int_{-\infty}^{\infty} f(\tau + t)^2 d\tau}}, \quad (5)$$

where g(r) and f(τ+t) are two real valued functions.

The local signal at each pixel of the image patch may be altered by traversing the scale-space of the image patch. In one embodiment, the scale-space is a set of Gaussian image pyramids, of which each level corresponds to a frequency scaling of the original image. Each Gaussian image pyramid is centered on a pixel of the image patch. Various embodiments traverse up the scale-space representations of image patches created at step 106, respectively, until the local frequency signals are determined to match. As such, the local frequency signals for the image patches are equalized at that level.

Figure 4:
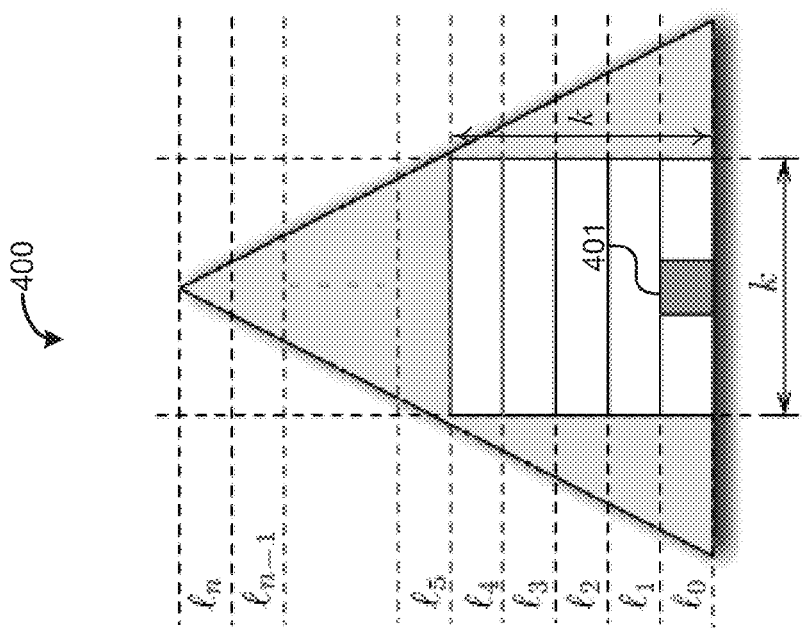
FIG. 4 illustrates an exemplary image pyramid of an image patch in accordance with an embodiment of the present application.

FIG. 4 illustrates an exemplary image pyramid 400 of an image patch in accordance with an embodiment of the present application. As illustrated, the original image patch may be on the lowest level (i.e., $l_0$), and each higher level (i.e., $l_n$, n is an integer) is a filtered and down-sampled version of the level below. For example, the level $l_3$ is a filtered and down-sampled version of the level $l_2$. In various embodiments, the optimal scale for matching is in a scale-space centered on the matching pixel. Each Gaussian image pyramid may be centered on a different pixel. As such, each pixel at the lowest level (i.e., $l_0$), is directly mapped to a unique pixel at a higher level (i.e., $l_n$, n is an integer) for all levels n.

In some embodiments, the scale space representation may be only determined for a region of interest around each pixel. This region of interest may be defined by the matching window. For example, as illustrated in FIG. 4, the scale space representation may be only generated for a window with a size of k×k centered around a pixel 401. In some embodiments, the scale space representation may be created in response to a correspondence matching request.

Equalized local signals may be used for determining correspondence matching between images. The image patches may be used directly for correspondence determination when they are locally centered on a respective pixel, contain the optimal frequency content for matching, and contain consistent signals. In various embodiments, the frequency information may be generated only locally for each image patch, and the scale-space representation for an entire image patch may be generated iteratively by sequencing though every image patch.

Figure 5:
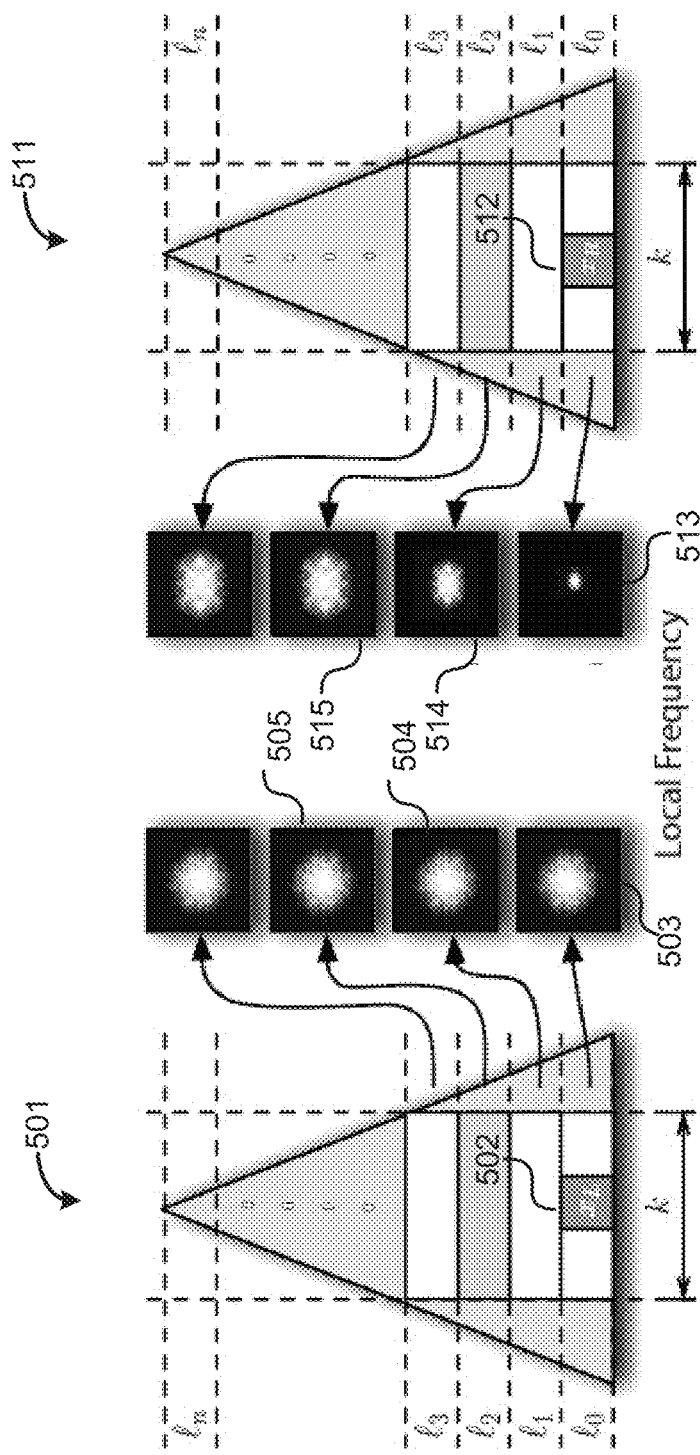
FIG. 5 illustrates equalizing image patches centered around pixels in accordance with an embodiment of the present application.

FIG. 5 illustrates equalizing image patches 501 and 511 centered around pixels 502 $\chi_L$ and 512 $\chi_R$, respectively. Starting from the bottom level of the scale-space for each pixel on both scan-lines, the highest local frequencies for image pixels may be compared to determine whether the image pixels match. For example, starting from the bottom level $l_0$, the highest local frequencies $\tilde{\omega}_L$ and $\tilde{\omega}_R$ for image pixels 502 and 512 (i.e., $\chi_L$ and $\chi_R$), respectively, may be compared to determine whether image pixels 502 and 512 match. If the difference between the highest local frequencies is determined to be less than a threshold, the highest local frequencies $\tilde{\omega}_L$ and $\tilde{\omega}_R$ may be considered to match. At a level, if either local patch does not meet the required frequency content, then the frequency representation for each image patch may be traversed up one level to determine whether the highest local frequencies match. The process may be repeated until the image patches contain sufficiently high frequencies.

For example, starting from level $l_0$, the local frequencies 503 and 513 for pixels 502 and 512, respectively, are compared and determined not to match. Traversing up to level $l_1$, the local frequencies 504 and 514 for pixels 502 and 512, respectively, are compared and determined not to match. Traversing up to level $l_2$, the local frequencies 505 and 515 for pixels 502 and 512, respectively, are compared and determined to match. In the illustrated example, at the level $l_2$, the frequency representation of the image patches 501 and 511 may be used directly for correspondence determination because they are locally centered on $\chi_L$ and $\chi_R$ respectively, contain the optimal frequency content for matching, and contain consistent signals.

Figure 6:
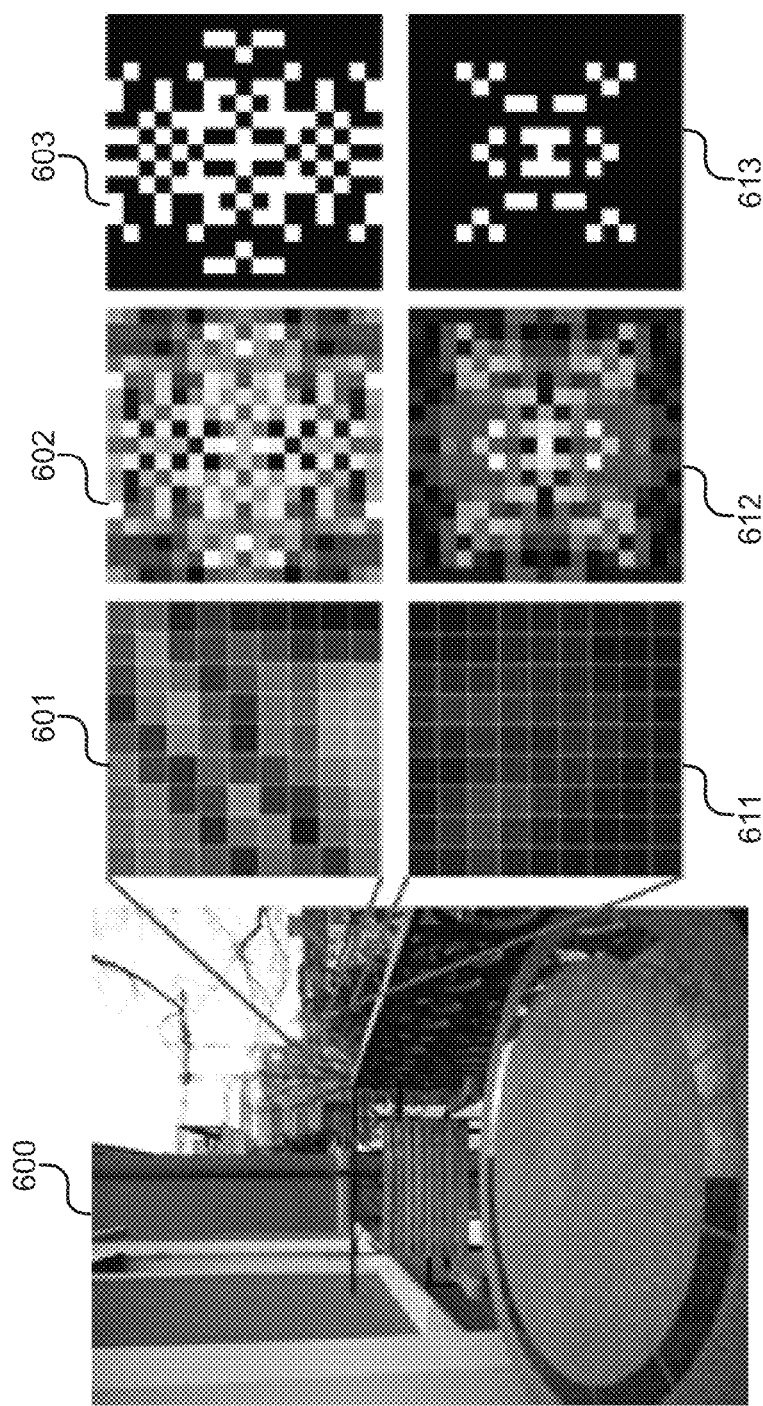
FIG. 6 illustrates exemplary frequency content for image patches of an image in accordance with an embodiment of the present application.

FIG. 6 illustrates exemplary frequency content 602-603 and 612-613 for image patches 601 and 611 of an image 600, respectively. The frequency content 602 and 612 are determined by using the Discrete Fourier transform (DFT) of the image patches 601 and 611, respectively. Local frequency information may be determined at each point in an image and the highest spatial frequency within a local region. Moreover, the DFT for one or more local patches from each image may be individually determined to measure the image frequency for the local patch. The frequency content 603 and 613 are frequency content selected from frequency content 602 and 612, according to a pre-determined amplitude threshold criteria. As illustrated, comparing frequency content 603 to 613, an image patch that contains high spatial frequencies may match more robustly than one with only low frequency information. The best matching frequency is the highest possible.

Figure 7:
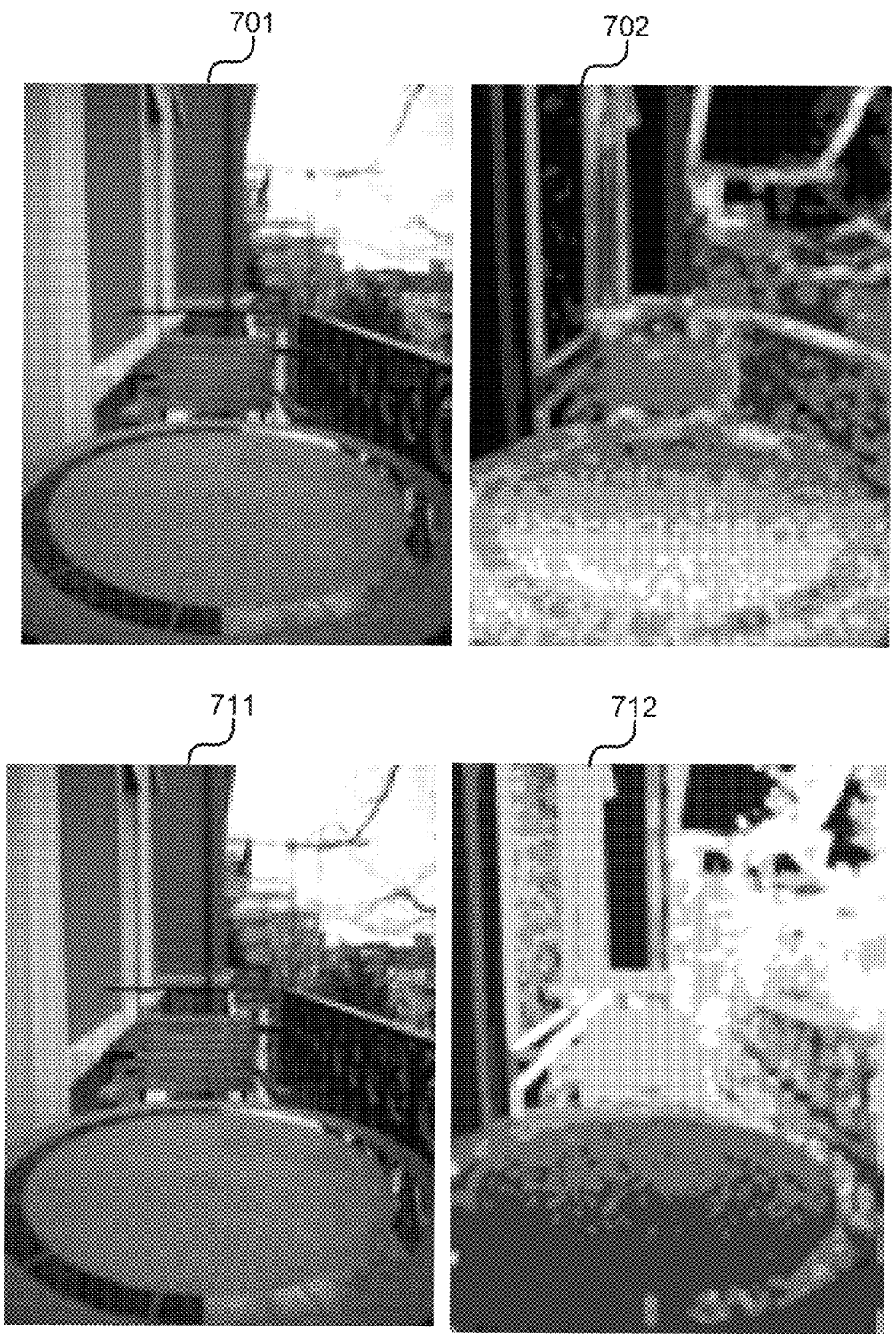
FIG. 7 illustrates local frequency maps for images in accordance with an embodiment of the present application.

FIG. 7 illustrates local frequency maps 702 and 712 for images 701 and 711, respectively. The images 701 and 711 are images of the same scene but have different focal planes. The image 701 has a near or short focal plane and the image 711 has a far or long focal plane. The local frequency maps 702 and 712 are created with a window size k of 9 and the amplitude threshold α of 0.4. α characterizes the amplitude of the image noise in the frequency domain. By thresholding the frequency amplitudes, noise may be accounted for, thereby enabling the determination of the highest reliable frequency $\tilde{\omega}p$. $\omega p$ may be determined for every pixel when determining the local frequency maps 702 and 712 for the images 701 and 711, respectively. As illustrated, the local frequency maps 711 and 712 are highly correlated with the image focus.

Figure 8:
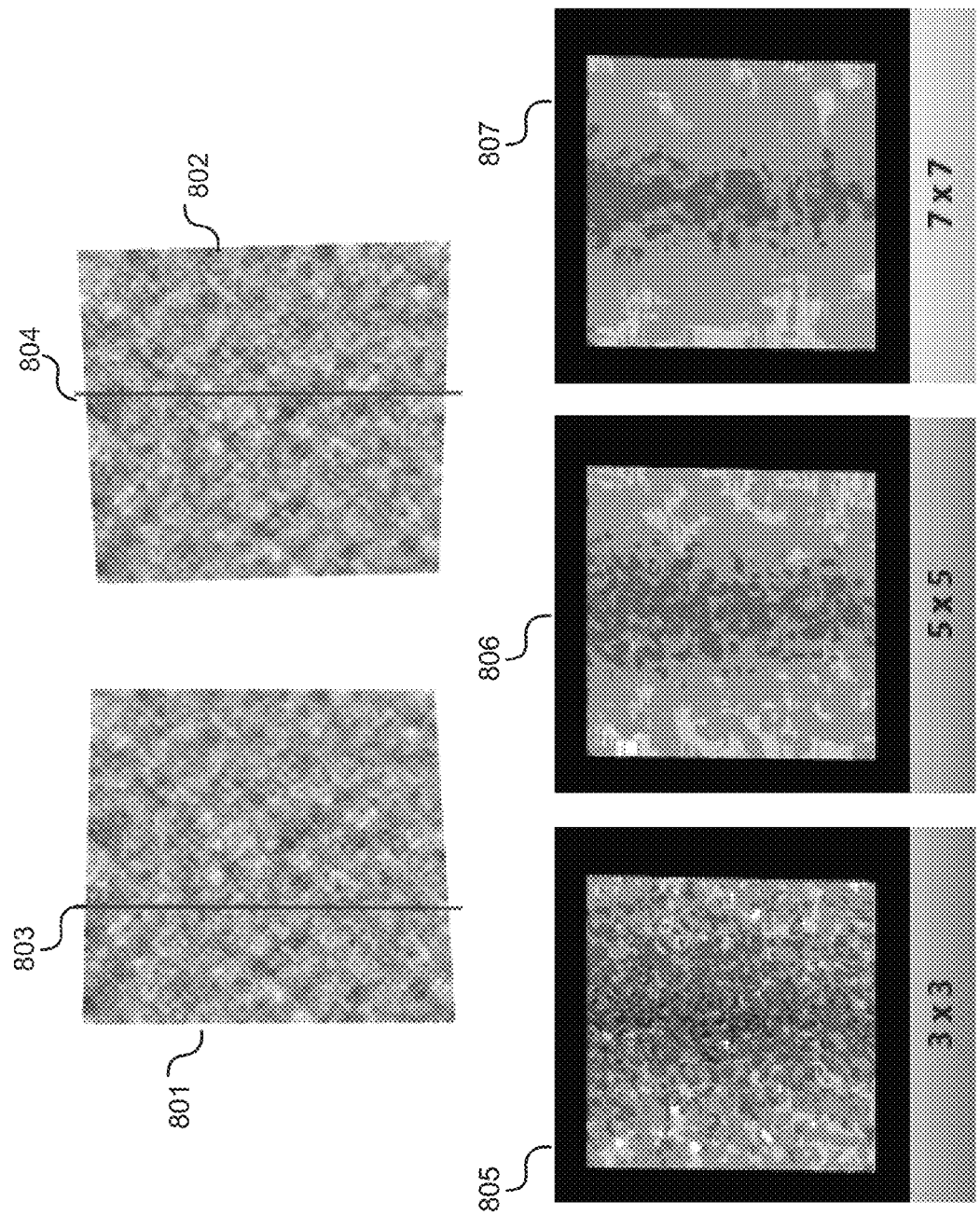
FIG. 8 illustrates the level of the scale-space at which the marching occurs for each pixel of images in accordance with an embodiment of the present application.

FIG. 8 illustrates the level of the scale-space at which the marching occurs for each pixel of images 801-802. The images 801-802 are images of the same scene but with different focuses. Lines 803-804 indicate the approximate location of the focal planes used to acquire the image data in images 801-802, respectively. In the illustrated example, the images 801-802 are generated with wavelet noise texture and rendered using a Mitsuba physically-based renderer with simulated shallow depth of field. Graphs 805-807 illustrate matching level for every pixel of images 801-802 at window sizes k of 3, 5, 7, respectively. As illustrated, increasing the window size increases the regularization of patch matching algorithms thereby improving their robustness, but at the same time reduces their spatial resolution.

In the illustrated example, darker areas correspond to matching at lower levels. Comparing graphs 805-807, smaller window sizes matching is spread out over many layers in the scale-space because the frequencies present in such a limited neighborhood vary substantially across patches. Within larger window sizes, the variation of frequency content is lower and thus the matching levels are spatially more correlated, revealing the expected behavior that the matching level is a function of signal dissimilarity due to degradation.

Figure 9:
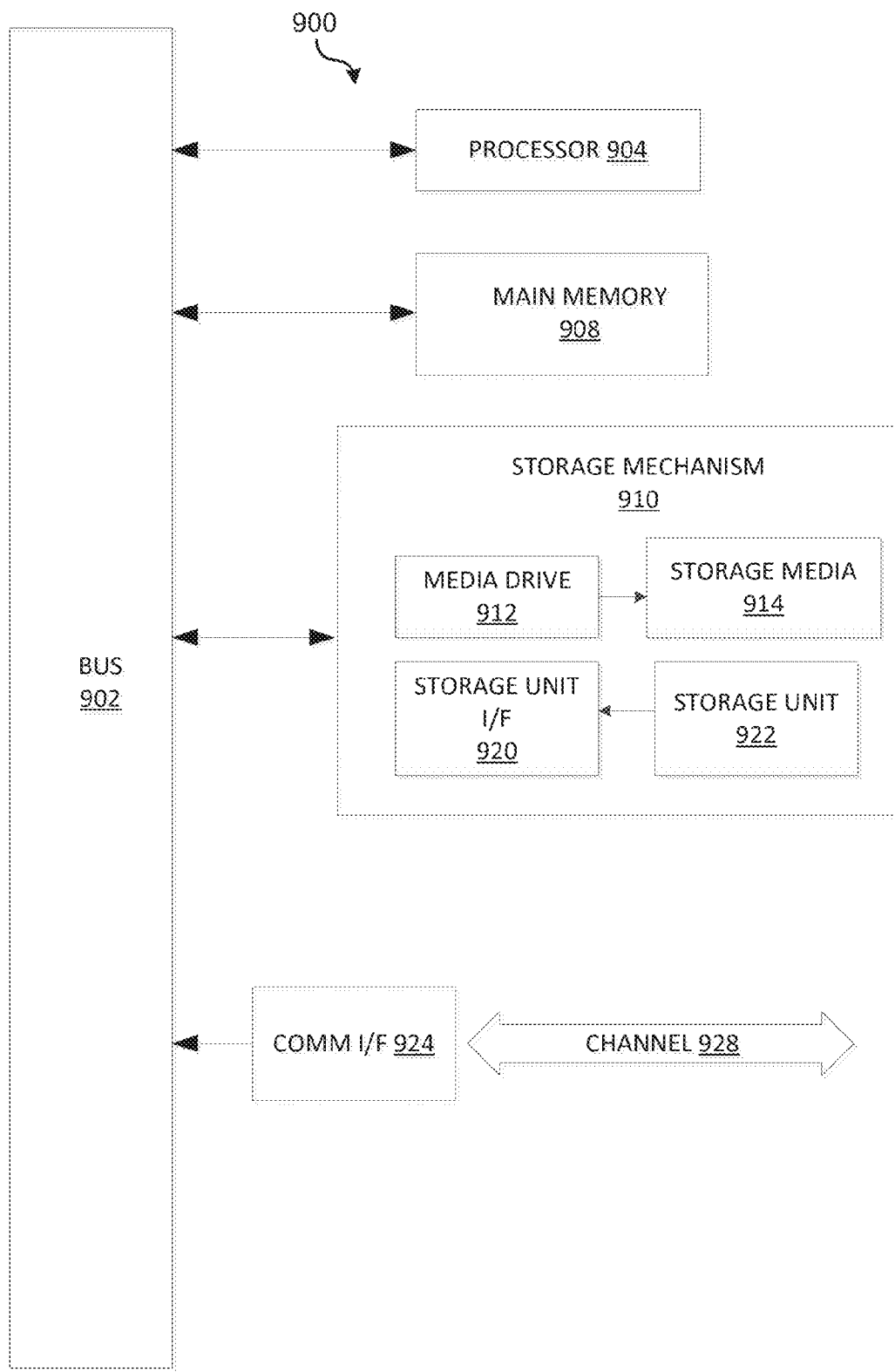
FIG. 9 illustrates an example computing module that may be used to implement various features of the systems and methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 9. Various embodiments are described in terms of this example-computing module 900. After reading this description, it will become apparent to a person skilled in the relevant art how to implement the application using other computing modules or architectures.

Referring now to FIG. 9, computing module 900 may represent, for example, computing or processing capabilities found within desktop, laptop, notebook, and tablet computers; hand-held computing devices (tablets, PDA's, smart phones, cell phones, palmtops, smart-watches, smart-glasses etc.); mainframes, supercomputers, workstations or servers; or any other type of special-purpose or general-purpose computing devices as may be desirable or appropriate for a given application or environment. Computing module 900 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 900 might include, for example, one or more processors, controllers, control modules, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing module 900 or to communicate externally.

Computing module 900 might also include one or more memory modules, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing module 900 might likewise include a read only memory ("ROM") or other static storage device coupled to bus 902 for storing static information and instructions for processor 904.

The computing module 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical disk drive, a CD or DVD drive (R or RW), or other removable or fixed media drive might be provided. Accordingly, storage media 914 might include, for example, a hard disk, a solid state drive, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing module 900. Such instrumentalities might include, for example, a fixed or removable storage unit 922 and a storage interface 920. Examples of such storage units 922 and storage interfaces 920 can include a program cartridge and cartridge interface, a removable memory (for example, a flash memory or other removable memory module) and memory slot, a PCMCIA slot and card, and other fixed or removable storage units 922 and storage interfaces 920 that allow software and data to be transferred from the storage unit 922 to computing module 900.

Computing module 900 might also include a communications interface 924. Communications interface 924 might be used to allow software and data to be transferred between computing module 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 908, storage unit 920, media 914, and channel 928. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing module 900 to perform features or functions of the present application as discussed herein.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A computer-implemented method, comprising:
    identifying a first image patch and a second image patch, the first image patch corresponding to a first set of spatial frequency signals, and the second image patch corresponding to a second set of spatial frequency signals;
    determining a reference frequency ($\tilde{\omega}$) based on the first set of spatial frequency signals and the second set of spatial frequency signals;
    equalizing the first image patch and the second image patch based on the reference frequency by scaling the first image patch and the second image patch by $\pi/\tilde{\omega}$ to spread the frequencies over a domain; and
    determining correspondence matching between the equalized first image patch and the equalized second image patch.

2. The method of claim 1, wherein the step of determining the reference frequency comprises identifying a first cutoff frequency of the first image patch, identifying a second cutoff frequency of the second image patch, determining the reference frequency as a lower value of the first cutoff frequency and the second cutoff frequency.

3. The method of claim 2, wherein the step of identifying the first cutoff frequency comprises determining a first set of highest frequencies in the first image patch and the step of identifying the second cutoff frequency comprises determining a second set of highest frequencies in the second image patch, wherein each frequency of the first set of highest frequencies and the second set of highest frequencies has an amplitude higher than a threshold.

4. The method of claim 3, further comprising selecting the threshold according to a noise level.

5. The method of claim 2, wherein the step of determining the reference frequency comprises:
    generating a first local frequency map of the first image patch and a second local frequency map of the second image patch; and
    determining a first scale-space representation of the first image patch and a second scale-space representation of the second image patch;
    wherein the reference frequency is determined based on the first local frequency map, the second local frequency map, the first scale-space representation, and the second scale-space representation.

6. The method of claim 5, wherein the first scale-space representation is a first set of Gaussian image pyramids, each of the first set of Gaussian image pyramids is centered on a pixel of the first image patch, the second scale-space representation is a second set of Gaussian image pyramids, and each of the second set of Gaussian image pyramids is centered on a pixel of the second image patch.

7. The method of claim 2, wherein the first image patch and the second image patch are identified based on a correspondence matching window.

8. A system, comprising:
a processor; and
non-transitory memory storing a set of instructions, the set of instructions configured to cause the processor to:
- identify a first image patch and a second image patch, the first image patch corresponding to a first set of spatial frequency signals, and the second image patch corresponding to a second set of spatial frequency signals;
- determine a reference frequency ($\tilde{\omega}$) based on the first set of spatial frequency signals and the second set of spatial frequency signals;
- equalize the first image patch and the second image patch based on the reference frequency by scaling the first image patch and the second image patch by $\pi/\tilde{\omega}$ to spread the frequencies over a domain; and
- determine correspondence matching between the first image patch and the second image patch using the equalized spatial frequency signals.

9. The system of claim 8, wherein the step of determining the reference frequency comprises identifying a first cutoff frequency of the first image patch, identifying a second cutoff frequency of the second image patch, determining the reference frequency as a lower value of the first cutoff frequency and the second cutoff frequency.

10. The system of claim 9, wherein the step of identifying the first cutoff frequency comprises determining a first set of highest frequencies in the first image patch and the step of identifying the second cutoff frequency comprises determining a second set of highest frequencies in the second image patch, wherein each frequency of the first set of highest frequencies and the second set of highest frequencies has an amplitude higher than a threshold.

11. The system of claim 10, wherein the set of instructions are configured to cause the processor to select the threshold according to a noise level.

12. The system of claim 9, wherein the set of instructions are configured to cause the processor to:
- generate a first local frequency map of the first image patch and a second local frequency map of the second image patch; and
- determine a first scale-space representation of the first image patch and a second space-scale representation of the second image patch;
- wherein the reference frequency is determined based on the first local frequency map, the second local frequency map, the first scale-space representation, and the second scale-space representation.

13. The system of claim 12, wherein the first scale-space representation is a first set of Gaussian image pyramids, each of the first set of Gaussian image pyramids is centered on a pixel of the first image patch, the second scale-space representation is a second set of Gaussian image pyramids, and each of the second set of Gaussian image pyramids is centered on a pixel of the second image patch.

14. The system of claim 9, the first image patch and the second image patch are identified based on a correspondence matching window.

* * * * *